US008429163B1

(12) United States Patent
Ahmadullin et al.

(10) Patent No.: US 8,429,163 B1
(45) Date of Patent: Apr. 23, 2013

(54) CONTENT SIMILARITY PYRAMID

(75) Inventors: Ildus Ahmadullin, Mountain View, CA (US); Jan Allebach, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/357,961

(22) Filed: Jan. 25, 2012

(51) Int. Cl.
*G06F 17/30* (2006.01)

(52) U.S. Cl.
USPC .......................................... 707/737; 382/305

(58) Field of Classification Search .................. 382/305; 707/737
See application file for complete search history.

(56) References Cited

U.S. PATENT DOCUMENTS

| 6,233,367 | B1 * | 5/2001 | Craver et al. | 382/305 |
|---|---|---|---|---|
| 6,556,723 | B2 * | 4/2003 | Craver et al. | 382/294 |
| 6,628,846 | B2 * | 9/2003 | Craver et al. | 382/305 |
| 6,792,163 | B2 * | 9/2004 | Seol et al. | 382/305 |
| 7,016,553 | B2 * | 3/2006 | Craver et al. | 382/305 |
| 7,286,724 | B2 * | 10/2007 | Seol et al. | 382/305 |
| 7,921,379 | B1 | 4/2011 | Ko | |
| 7,961,925 | B2 * | 6/2011 | Chen et al. | 382/128 |
| 8,027,541 | B2 | 9/2011 | Hua et al. | |
| 8,299,435 | B2 * | 10/2012 | Zhang et al. | 250/341.1 |
| 2010/0185672 | A1 | 7/2010 | Rising, III | |
| 2011/0055203 | A1 | 3/2011 | Gutt et al. | |

FOREIGN PATENT DOCUMENTS

| CN | 101751439 A | 6/2010 |
|---|---|---|
| WO | 2010086610 A1 | 8/2010 |

OTHER PUBLICATIONS

Jollife, I.T. Principal Component Analysis. Springer Series in Statistics, Springer, NY, 2002, 518 pgs.
Nguyen, G.P., Worring, M., "Interactive access to large image collections using similarity-based visualization", ScienceDirect, Journal of Visual Languages and Computing, 19 (2008), pp. 203-224.
Flickner, M., Sawhney, H., Niblack, W., Ashley, J., Huang, Q., Dom, B., Gorkani, M., Hafner, J., Lee, D., Petkovic, D., Steele, D., and Yanker, P., "Query by image and video content: The QBIC system", Computer 28, (Sep. 1995), pp. 23-32.
MacCuish, J., McPherson, A., Barros, J., Kelly, P., "Interactive layout mechanisms for image database retrieval", In Proceedings of Conf. on Visual Data Exploration and Analysis III (Jan. 31-Feb. 2, San Jose, CA), SPIE/IS&T, 1996, vol. 2656, pp. 104-115.
Chen, J-Y., Bouman, C.A., Dalton, J., "Similarity pyramids for browsing and organization of large image databases", In Proceedings of Conf. on Human Vision and Electronic Imaging III (Jan. 26-29, San Jose, CA), SPIE/IS&T, 1998, vol. 3299, pp. 563-575.
Chen, J-Y., Bouman, C.A., Dalton, J., "Active browsing using similarity pyramids", In Proceedings of Conf. on Storage and Retrieval of Image and Video Database VII (Jan. 26-29, San Jose, CA), SPIE/IS &T, 1999, vol. 3656, pp. 144-154.

(Continued)

*Primary Examiner* — Jean M Corrielus

(57) ABSTRACT

A method of presenting a plurality of content includes receiving measurements of similarity distances between content of the plurality of content; mapping the content to a two-dimensional surface based on the similarity distances; and partitioning the content of the two-dimensional surface into k levels of a similarity pyramid, wherein each of the k levels includes $4^k-1$ cells, and wherein each content of the plurality of content is separately mapped to one of the cells on one of the k levels of the similarity pyramid.

14 Claims, 10 Drawing Sheets

OTHER PUBLICATIONS

Lawrence, K.S., Roweis, S., "Nonlinear dimensionality reduction by locally linear embeddin", Science 290, 5500 (2000), pp. 2323-2326.

Tenenbaum, J.B., de Silva, V., Langford, J.C., "A global geometric framework for nonlinear dimensionality reduction", Science 290, 5500 (2000), pp. 2319-2323.

Rissanen, J., "A universal prior for integers and estimation by minimum description length", The Annals of Statistics 11, 2 (1983), pp. 417-431.

Bitlis, B., Feng, X., Harris, J.L., Bouman, C.A., Pollak, I., Harper, M.P., Allebach, J.P., "A hierarchical document description and comparison method", In Proceedings of Archiving Conference, (April, San Antonio, TX), IS&T, 2004, pp. 195-198.

Cheng, H., Bouman, C.A., "Multiscale Bayesian segmentation using a trainable context model", In IEEE Trans. on Image Processing 10, 4 (2001), pp. 511-525.

Achanta, R., Hemami, S., Estrada, F., Susstrunk, S., "Frequency-tuned salient region detection", In Proceedings of International Conference on Computer Vision and Pattern Recognition, (June, Miami, FL), IEEE, 2009, pp. 1597-1604.

Julier, S. J., and Uhlmann, J. K., "Unscented filtering and nonlinear estimation", In Proceedings of the IEEE 92, 4, (2004), pp. 401-422.

Goldberger, J., Roweis, S., Hinton, G., Salakhutdinov, R., "Neighborhood Component Analysis", In Proceedings of Neural Information Processing Systems, (December, Vancouver, Canada ), 2004, pp. 513-520.

Dijkstra, E. W., "A note on two problems in connexion with graphs", Numerische Mathematik 1, (1959), pp. 269-271.

Saul, Lawrence K., "Think Globally, Fit Locally: Unsupervised Learning of Nonlinear Manifolds", Technical Report MS CIS-02-18, University of Pennsylvania, 2002, pp. 1-33.

Saul, Lawrence K. et al., "Think Globally, Fit Locally: Unsupervised Learning of Low Dimensional Manifolds", Journal of Machine Learning Research 4, Jun. 2003, 37 pgs.

Roweis, Sam, "Scientific Publications", retrieved from http://www.cs.nyu.edu/~roweis/publications.html, Nov. 29, 2012.

* cited by examiner

| Class 1 | Class 2 | Class 3 | Class 4 | Class 5 |
|---------|---------|---------|---------|---------|
| 76.47 % | 100 %   | 100 %   | 91.67 % | 100 %   |

CONTENT SIMILARITY PYRAMID

BACKGROUND

Managing large document databases may be a daunting task. While a user may wish to browse the whole database, a user also may wish that documents are sorted with respect to visual similarity and/or layout features. Simply presenting documents in a random order, however, is less than ideal.

DETAILED DESCRIPTION

Figure 1C:
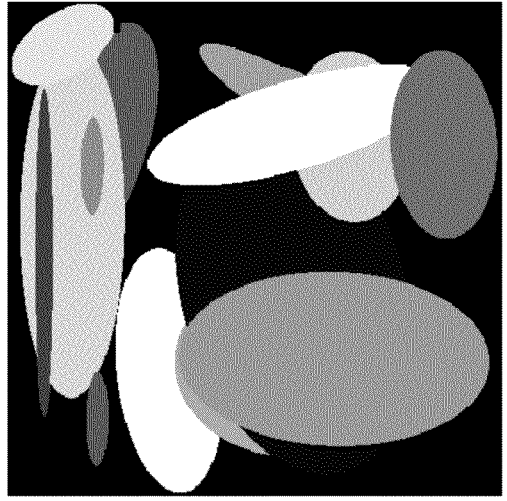
FIGS. 1A, 1B, and 1C illustrate one example of extraction and modeling of a document background component.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "includes" means includes but not limited to, the term "including" means including but not limited to. The term "based on" means based at least in part on.

The present disclosure provides methods and systems for organization of content in a three-dimensional (3-D) hierarchical structure called a similarity pyramid. The content may include, for example, print content such as documents or images, audio content such as music, or video content. In the examples illustrated and described below, the content includes documents, namely, single-page documents. It is understood, however, that the methods and systems illustrated and described herein also may be applied to other content.

As illustrated and described herein, the similarity pyramid is constructed from a document database that is embedded on a two-dimensional (2-D) surface by use of a nonlinear dimensionality reduction algorithm. The mapping algorithm preserves similarity distances between documents by mapping documents that are close to each other in a feature space to points on a 2-D surface that are close to each other. With the similarity pyramid, a user can browse the database by moving along a certain level of the pyramid as well as by moving between different levels of the pyramid.

Being able to effectively compare documents with respect to their visual similarity may be useful in many applications, such as document retrieval, document classification, and managing large document databases. Comparing visual similarity of documents may be useful when searching for documents of a specific style in a large document database or when looking for a document most similar to a query. For example, a user may want to browse and search for a greeting card in a large database sorted not with respect to the themes and content of the cards, but rather, by taking into consideration the visual similarity of the cards. Calculating the similarity of documents in this way involves comparing, for example, layout structure along with the position, size, color, and/or type of the logical regions of documents.

As described herein, the document database is organized in a way that preserves document similarities. Sorting documents with respect to their visual similarity and layout features, and visualization of the whole document database is one application of such organization. In browsing and searching applications, clustering similar documents and organizing the document database with respect to the clusters is more useful as compared to presenting the documents in a random order.

One known hierarchical structure for organizing an image database includes a pyramid constructed from a quad tree, where each leaf node corresponds to an image, and a non-leaf node represents a group of images in its descendant leaves. Given a simple image similarity distance, the tree construction algorithm proceeds in bottom-up fashion, by merging most similar images into their parent nodes. The procedure is then repeated until the tree root is reached. The tree is then mapped onto a pyramid, where each node is placed in a cell at some level of the pyramid. However, because the images on the low levels of the pyramid correspond to different branches of the tree, a user may discern a very significant border between groups of images. Accordingly, such hierarchical structure fails to provide a smooth transition, for example, in the low levels of the pyramid, between images that belong to different branches of the tree that are adjacent to each other.

With the present disclosure, rather than constructing a quad tree and then mapping it onto a pyramid, direct pyramid construction is performed with each layer of the pyramid including a 2-D embedding of the document database. In this way, a smooth transition between documents, even in low levels of the pyramid, is provided.

As described below, the similarity pyramid is constructed such that a kth level of the pyramid is a 2-D grid consisting of $4^{k-1}$ cells corresponding to groups of images in the database, where k is an integer greater than or equal to one, and where k=1 corresponds to the highest level of the pyramid. In one example, as described below, each cell contains an image representing the group of documents to which it corresponds. The hierarchical structure of the similarity pyramid is such that higher levels of the pyramid contain images representing larger groups of roughly similar images, whereas lower levels of the pyramid contain images representing smaller groups of very similar images. Accordingly, a user can browse the database by moving along a certain level of the pyramid or by moving between levels of the pyramid.

In the construction of a similarity pyramid for a document database of the present disclosure, a nonlinear dimensionality reduction algorithm is applied to the document dataset to map the documents onto a 2-D surface. A non-limiting example of the nonlinear dimensionality reduction algorithm includes the Isomap algorithm as illustrated and described in Tenenbaum, et al., *A Global Geometric Framework For Nonlinear Dimensionality Reduction*, Science, Vol. 290, No. 5500, December 2000, pp. 2319-2323. The Isomap algorithm uses a graph constructed on connecting k nearest neighbors of each document where the distance matrix is approximated by calculating the remaining entries using a shortest-path criterion. The distance matrix is then used to compose a lower dimensional manifold.

In one example, before applying the nonlinear dimensionality reduction algorithm, similarity measurement calculations are performed for each document of the dataset. One non-limiting example of calculating similarity measurements for the documents of the dataset is illustrated and described below. In the non-limiting example, a document similarity function is defined by analyzing document background, text box, and saliency components such that the similarity distance between each of these components is calculated separately, and the similarity measure of the entire document is calculated as a weighted sum of these distances. Afterwards, the nonlinear dimensionality reduction algorithm is applied to the document dataset to map the documents onto a 2-D surface. Accordingly, as described below, the similarity pyramid is constructed by iteratively dividing the 2-D embedded document dataset into clusters of points.

Document Components

In one example, measurement of the visual similarity between two single-page documents is based on a background component, a text box component, and a saliency component, with the background component including a position, size, shape, and/or color of background images and graphical objects, the text box component including a position, size, and/or shape of text regions, and the saliency component including regions and/or objects that stand out with respect to their neighborhood. In one example, prior to the component composition, the document is scaled to a single size that is used for all types of documents. In one example, to facilitate processing of both landscape and portrait orientations, the scaled document shape is selected to be square.

Document Background Component

In one example, the background component $D^b$ of a document page is extracted by erasing all of the text present on the document page. The background component includes not only the background images that do not overlap with text regions, but also the background images that are underneath the text, if there are any.

In one example, prior to feature extraction, the background component is converted from RGB to L*a*b* color space. Next, a set of five-dimensional feature vectors (x,y,L,a,b) consisting of each pixel coordinate (x,y) and the corresponding L*a*b* color value at that pixel is extracted. Thus, the document background is represented as a feature set in five-dimensional space.

Next, a search for dominant clusters in the feature set is performed, assuming that the dominant clusters can be effectively represented as Gaussians. In one example, the Expectation Maximization (EM) algorithm is used to determine the maximum likelihood parameters of a mixture of Gaussians that best represents the feature set. In one non-limiting example, the number of Gaussians in each mixture may be determined according to the Maximum Description Length (MDL) principle as illustrated and described in Rissanen, *A Universal Prior For Integers And Estimation By Minimum Description Length*, The Annals of Statistics, Vol. 11, No. 2, 1983, pp. 417-431.

Figure 1B:
Figure 1A:
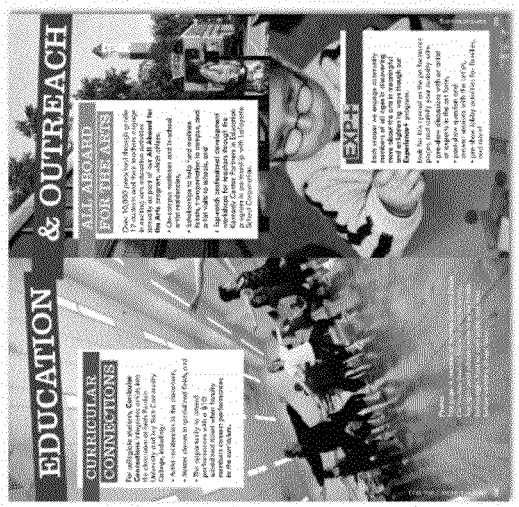

FIGS. 1A, 1B, and 1C illustrate one example of a document background component and the corresponding visualization of the GMM (Gaussian Mixture Model) distribution. More specifically, FIG. 1A illustrates the original document D, FIG. 1B illustrates the background component $D^b$, and FIG. 1C illustrates the visualization of Gaussians in the GMM for the background component $D^b$. Since each vector in the GMM is five dimensional, it is not possible to illustrate the exact GMM. Accordingly, each Gaussian in the mixture is depicted as an ellipsoid, with each ellipsoid representing the spatial location, size, shape, and mean color of the Gaussian to which it corresponds.

Document Text Box Component

The document text box component $D^t$ is used to emphasize the location of text in a document. In one example, after enclosing all text in the document in bounding boxes, document text box component $D^t$ is defined as a binary image, where pixels corresponding to text bounding boxes are assigned a value of 1, while all remaining pixels have a value of 0.

In one non-limiting example, detecting text in the document may be performed, for example, using the TSMAP document segmentation algorithm as illustrated and described in Cheng et al., *Multiscale Bayesian Segmentation Using A Trainable Context Model*, IEEE Transactions on Image Processing, Vol. 10, Issue 4, April 2001, pp. 511-525. Detecting text in the document also may be done using PDF document text extraction software or optical character recognition, for example, if the document is in an image format.

In one example, the feature set of the text box component consists of the two-dimensional vectors (x,y) of the coordinates of the pixels that correspond to the text bounding boxes. After constructing a mixture of Gaussians using the EM and MDL algorithms, a probabilistic representation of the location of text in the document is established. Note that the actual text content is not considered.

Figure 2A:
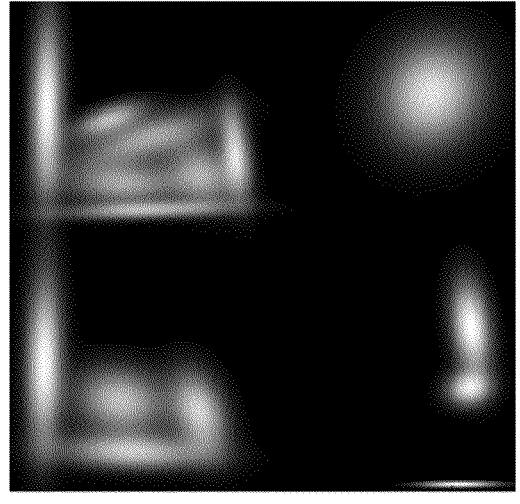
FIGS. 2A, 2B, and 2C illustrate one example of extraction and modeling of a document text box component.
Figure 2B:
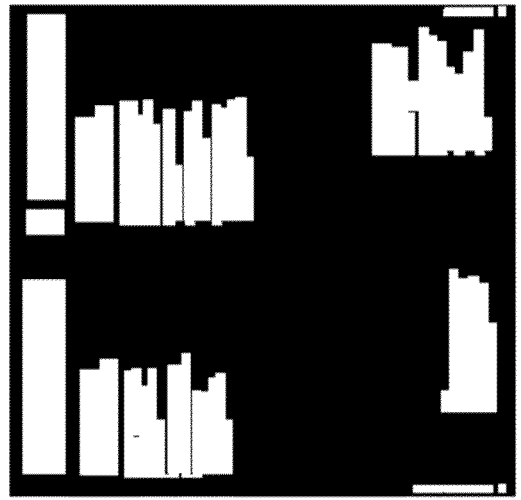
Figure 2C:
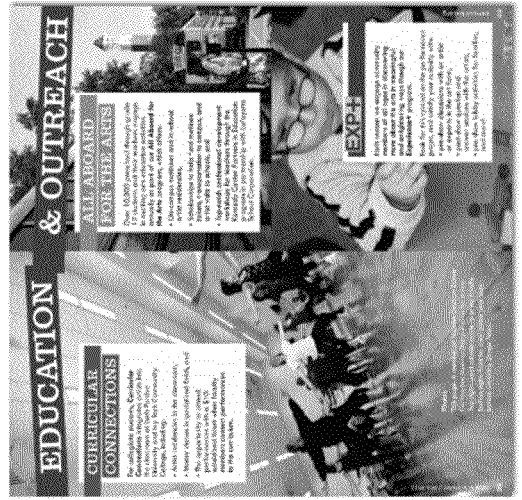

FIGS. 2A, 2B, and 2C illustrate one example of a document text box component. More specifically, FIG. 2A illustrates the original document D, FIG. 2B illustrates the text box component $D^t$, and FIG. 2C illustrates the visualization of Gaussians in the GMM for the text box component $D^t$.

Document Saliency Component

In one example, saliency is used in document feature extraction to represent regions or objects that are visually most distinctive. Salient regions (or regions that stand out with respect to their neighborhood) are the most distinctive, such that the similarity of such regions in different documents plays a role in the visual comparison of these documents. The salient regions can be background images, for example, in the case of advertisement brochures, or text, for example, in the case of bright, colorful headers in magazines. One approach for the computation of a saliency for each pixel is based on exploitation of features of color and luminance, such that boundaries of salient regions as well as salient colors are detected.

In one example, as in the case of the background component, the document is initially converted to the L*a*b* color space. Then, to eliminate fine texture details, the document is blurred with a Gaussian filter with $\sigma=3$ pixels. The saliency of each pixel of a document is calculated as the squared Euclidian distance between the L*a*b* value at that pixel location in the blurred document and the average L*a*b* value of the entire document.

In one example, the document saliency component is represented as a grayscale image $D^s$, where each pixel is assigned the saliency value defined above. The feature set of the saliency component consists of the three-dimensional vectors (x,y,S(x,y)) of the coordinates of each pixel of the document along with its saliency value. As with the text box component and the background component, using the EM and MDL algorithms, a corresponding probabilistic representation of saliency in the document in terms of a Gaussian mixture model is obtained.

Figure 3A:
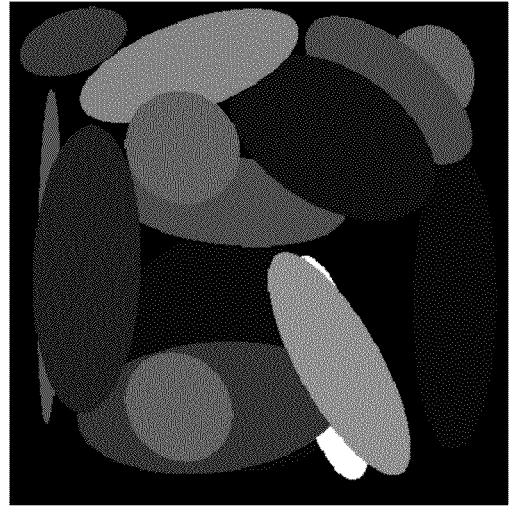
FIGS. 3A, 3B, and 3C illustrate one example of extraction and modeling of a document saliency component.
Figure 3B:
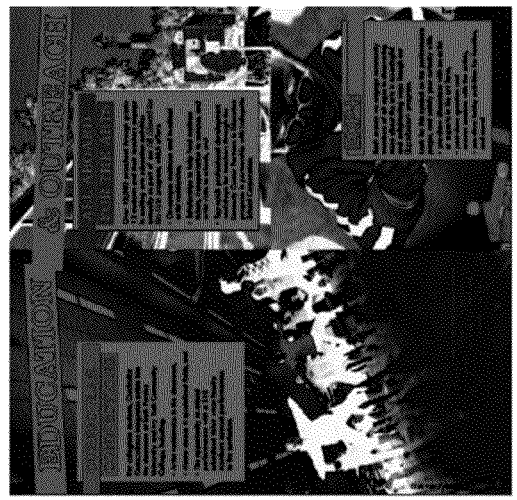
Figure 3C:
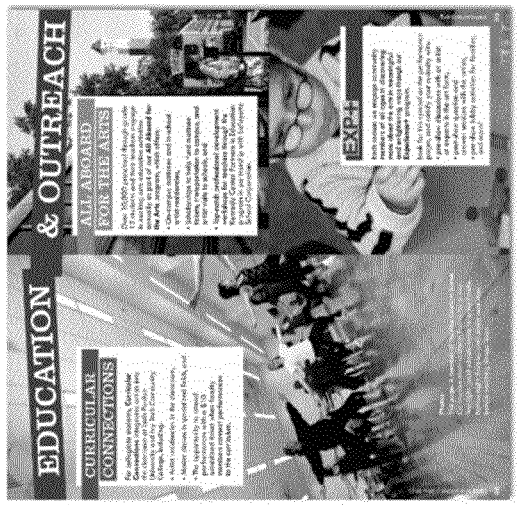

FIGS. 3A, 3B, and 3C illustrate one example of a document saliency component. More specifically, FIG. 3A illustrates the original document D, FIG. 3B illustrates the saliency component $D^s$, and FIG. 3C illustrates the visualization of Gaussians in the GMM for the saliency component $D^s$. In one example, in a manner similar to that of FIG. 1C for the background component, each Gaussian is represented as an ellipsoid.

Document Similarity Measure Calculation

Once the features of a document are represented by Gaussian mixture distributions, a similarity measure between the components of two documents is calculated by comparing their GMMs. There are a number of known distance functions that may be used to calculate the similarity of two probability distributions. Among these functions, a distance function that obeys the triangle inequality is used. Such approach provides for accurate approximation of the geodesic distances used in the Isomap algorithm.

In one example, Hellinger distance is used. The Hellinger distance is defined as:

$$H(f,g) = \|(f)^{1/2} - (g)^{1/2}\|_2$$

As such, the Hellinger distance is represented as the expectation of a non-linear function with respect to one of the distributions f or g. In one example, the expectation is approximated with use of the Unscented Transform.

Once two documents are separately compared with respect to their background, text, and saliency components, an overall document similarity measure is calculated as a weighted sum of the distances between the corresponding GMMs. Such weights may also be regarded as the degree of relative significance of each of the components in the overall document visual similarity comparison. Thus, in one example, each of the weights are non-negative.

One application of the document similarity measure is document style recognition. For example, the document similarity measure may be used to distinguish between documents of different styles. In essence, given two sets of documents from different publication types (e.g., one from a fashion magazine and the other from an advertisement brochure), the similarity measure may be used to automatically recognize the publication type and identify which document belongs to which type.

In one example, weights of the overall document similarity measure may be trained with respect to a training set that includes a collection of documents labeled according to their type. In one non-limiting example, a training dataset of five different classes, each containing from 45 to 175 documents, ranging from magazine pages to newsletters, was used. Included in the collection was a variety of documents with different complexity and visual appearance (black and white, and color documents), documents consisting of mostly text, and documents with bright images in the background. In one non-limiting example, component weights may be calculated using the Neighbourhood Component Analysis as illustrated and described in Goldberger et al., *Neighbourhood Component Analysis*, Proceedings of Neural Information Processing Systems, December 2004, pp. 513-520. As such, documents in the same class appear close to each other, whereas documents in different classes will be further away from each other.

Isomap Nonlinear Low Dimension Embedding Algorithm

The present disclosure includes use of a nonlinear low dimension embedding (or dimensionality reduction) algorithm. As noted above, one non-limiting example of such an algorithm includes the Isomap algorithm. The Isomap algorithm was presented as an approach to solving dimensionality reduction tasks using measured local metric information to learn the underlying global geometry of a dataset. However, the algorithm also may be used on any data set with a defined distance metric. In this regard, the Isomap algorithm is applied to a document dataset with the similarity measure described above.

As used herein, the Isomap algorithm provides a method for estimating the intrinsic geometry of a document dataset, based on neighbors of each document in the dataset. The Isomap algorithm is convenient since, as an input, it only needs a sparse distance matrix containing distances between only a few neighbors of each document. This makes the algorithm computationally inexpensive to implement.

With the Isomap algorithm, the geodesic distances between distant documents may be estimated, given only a document similarity measure. For neighboring documents, the algorithm uses the actual similarity measure. For distant documents, geodesic distance can be approximated by adding up a sequence of short hops between neighboring documents. In one example, these approximations are computed by finding shortest paths in a graph with edges connecting neighboring documents.

The Isomap algorithm has three steps:

Step 1: Compute k nearest neighbors of each document in the dataset. The distances are then used to construct a weighted graph G, where each node corresponds to a document in the dataset, and the edges correspond to the similarity measure between neighbors.

Step 2: Calculate a full matrix of geodesic distances $D_G$ between all documents in the dataset by setting the geodesic distances $d_G(i,j)$ between documents i and j to be the shortest paths in the graph G. In one example, such calculation may be achieved with Dijkstra's algorithm.

Step 3: Apply Multidimensional Scaling (MDS) to the matrix of graph distances $D_G = \{d_G(i,j)\}$. The points y in a d-dimensional Euclidean space Y are found by minimizing the cost function:

$$E = \|\tau(D_G) - \tau(D_Y)\|_2$$

where $D_Y$ is the matrix of Euclidian distances between the points y. The dimension d is any integer less than or equal to the number of documents in the dataset. The operator $\tau$ removes the means from each row and column of the matrices by multiplying them with the centering matrix from both sides. The global minimum of the cost function is achieved by setting the coordinates of the points y to be the top d eigenvectors of the matrix $\tau(D_G)$.

Similarity Pyramid

As noted above, the present disclosure provides a similarity pyramid constructed from a document database embedded on a 2-D surface. The 2-D dimensional embedding provides a convenient and intuitive visualization of the document database, where similar documents are mapped close to each other. Thus, to find documents of a specific type, a user may zoom into the region on the 2-D embedding that contains such documents. In this regard, to facilitate a search for such documents, the points in the 2-D embedding manifold are organized in a hierarchical structure.

Although the Isomap algorithm produces coordinates of the points in the 2-D manifold that correspond to the document database, use only of the relative position of the points y may be sufficient. More specifically, the relative location of each point with respect to its neighbors, rather than its exact position on a 2-D coordinate plane, may be sufficient for the embedding.

By means of a hierarchical structure for a browsing environment constructed in accordance with the present disclosure, a user may zoom into a region on a 2-D embedding of a document dataset corresponding to the documents of potential interest. In one example, the regions are presented to the user as a rectangular shape, and form a partition of the whole 2-D manifold.

In one example, and as further described below, the 2-D manifold is partitioned by cutting the 2-D manifold along the axes of the highest variance of the points in the manifold. Such axes may be referred to as principal components. Notably, this approach is equivalent to using an orthogonal linear transformation that transforms the manifold into a new coordinate system such that the greatest variance by any projection of the data points lies on the first coordinate, called the first principal component, and the second greatest variance lies on the second coordinate.

Figure 4A:
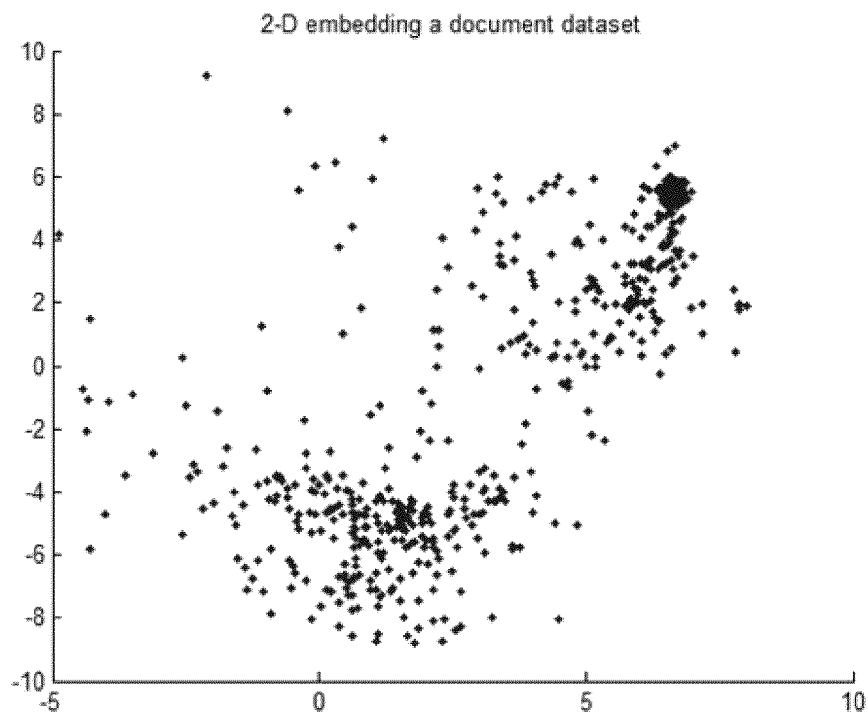
FIGS. 4A and 4B illustrate one example of a principal component coordinate system transformation.
Figure 4B:
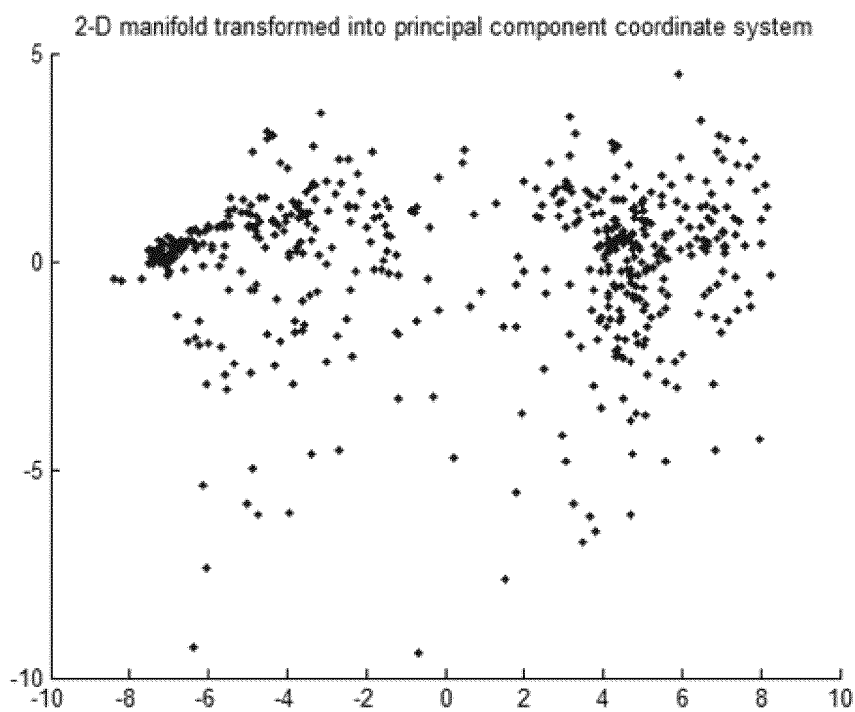

FIGS. 4A and 4B illustrate one example of a principal component coordinate system transformation. More specifically, FIG. 4A illustrates the actual 2-D embedding of a document dataset, and FIG. 4B illustrates the 2-D manifold after the principal component coordinate system transformation. After the transformation, vertical and horizontal directions correspond to the highest and second highest variances of the points on the 2-D manifold.

Figure 5:
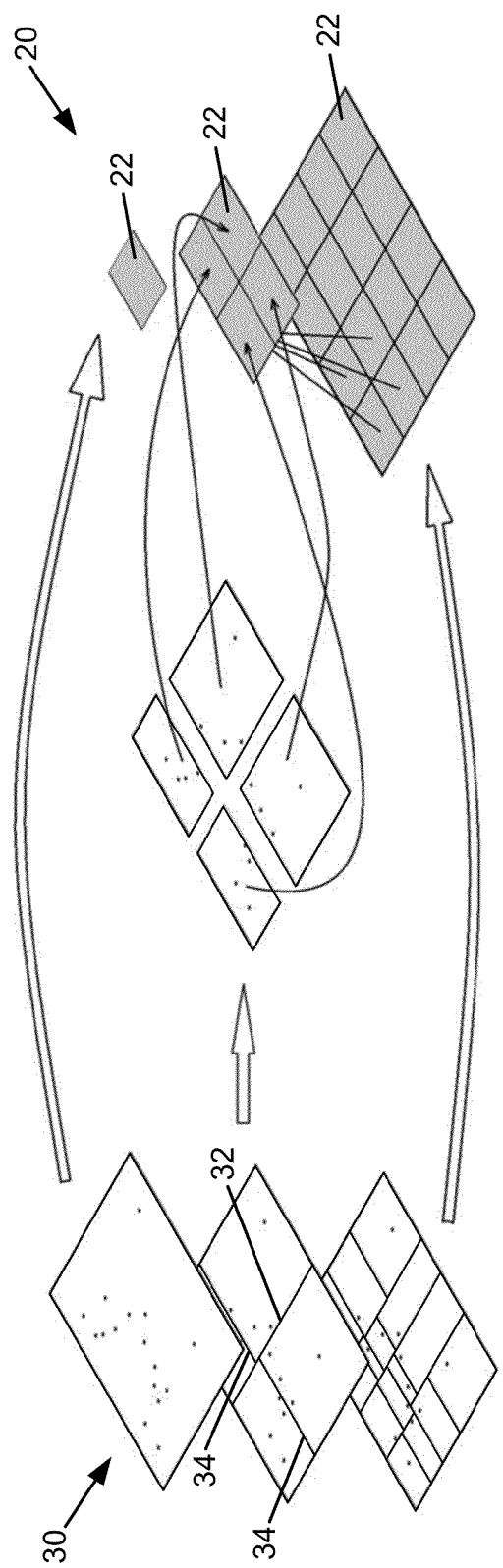
FIG. 5 illustrates one example of construction of a similarity pyramid from a 2-D manifold.

FIG. 5 illustrates one example of construction of a similarity pyramid 20 from a 2-D manifold 30. In the illustrated example, similarity pyramid 20 includes three levels 22. Each level 22 of pyramid 20 corresponds to a whole of 2-D manifold 30, and each cell of a given pyramid level corresponds to a cluster of points from a specific manifold region. In one example, the clusters from the regions are mapped to cells in a manner that preserves their relative location in the manifold. In addition, each cell at levels 1 and 2 (i.e., non-bottom levels) of pyramid 20 is assigned children cells from the next-lower level.

In one example, with the 2-D manifold transformed to the principal component coordinate system, the 2-D manifold is partitioned by cutting the 2-D manifold vertically and horizontally. More specifically, construction of similarity pyramid 20 is performed as follows, such that, in one example, each of k levels of the pyramid consists of $4^{k-1}$ regions or cells (e.g., 1, 4, and 16 regions or cells for respective levels 1, 2, and 3).

The top or first level of pyramid 20 consists of one cell $c_{1,1}$ that corresponds to the set of all points in the entire 2-D manifold 30. In one example, to construct the second level of pyramid 20, manifold 30 is partitioned into four regions by first dividing manifold 30 vertically, as represented by vertical axis 32. In one example, criterion for the dividing of manifold 30 includes establishing an equal number of points in each of the regions. If there are an odd number of points in the manifold, one of the regions may contain one point more than the other regions.

In continued construction of the second level of pyramid 10, after dividing manifold 30 vertically, each of the resulting regions is divided horizontally, as represented by horizontal axes 34. Again, criterion for the dividing of manifold 30 includes establishing an equal number of points in each of the new regions, or one of the regions may contain one point more than the other region if there are an odd number of points in the region being divided. Each of the four cells $c_{2,1}$, $c_{2,2}$, $c_{2,3}$, and $c_{2,4}$ on the second level corresponds to a cluster of points in each of the resulting four regions. In the illustrated example, points in each of the resulting regions are represented by retaining their relative locations.

In one example, to construct the third level of pyramid 20, each of the four regions of the second level of pyramid 20, including the entire 2-D manifold 30, is again partitioned vertically and horizontally, such that the resulting 16 clusters of points are represented by the 16 cells of the third level of pyramid 20. Again, in the illustrated example, points in each of the resulting regions are represented by retaining their relative locations.

In one example, the above procedure is repeated until each point is mapped separately to a cell at some level of the pyramid. If the number of points in the manifold is not $4^n$ for some integer n, empty cells will be present at the bottom level of the pyramid. Notably, the hierarchical structure of the pyramid lies in the fact that each cell located at a non-bottom level of the pyramid (e.g., levels 1 and 2) has four children on the next-lower level (e.g., levels 2 and 3).

With a one-to-one mapping between the documents in the dataset and the set of points in the 2-D manifold, the cells of the pyramid correspond to groups of documents in the dataset. In one example, each non-empty cell of the pyramid is assigned a document image icon to represent the group of documents in the cell. In one example, the assignment of icon images is performed in a bottom-up fashion, where the cells of the bottom level of the pyramid are either empty or correspond to only one document. In one example, each parent cell of the pyramid is assigned an icon image from the icon images assigned to its children (i.e., next-lower level). In the case of two non-empty children, either one of the two icon images can be used. In one example, the icon image of the cell that minimizes the distance to the corresponding cluster centroid is used. Assigning each parent cell of the pyramid an icon image from the icon images assigned to its children allows a user to maintain a relative orientation when moving across the levels of the pyramid during a browsing operation.

As described below, to support a browsing operation of the document dataset, the similarity pyramid is displayed on a Graphical User Interface (GUI). In one example, at the beginning of the browsing operation, level 3 of the pyramid, containing 16 documents, is displayed. By selecting (e.g., clicking on) a document image icon, a user can move to the next-lower level of the pyramid, while retaining a relative position within the pyramid. In one example, the child of the selected cell that has the same document image icon is directed to appear at the same location on the pyramid level grid. In another example, the user may backtrack to a higher level, such that the previous level of the pyramid is presented with proper centering. For large document databases, upper levels of the pyramid may be too large to display on one screen. Therefore, in one example, the user can pan across the levels of the pyramid in vertical and horizontal directions to search for the clusters of interest.

Document Database Cluster Learning

Acquiring information about documents present in the dataset may be beneficial. For example, a user may want to know what types of documents are present in the dataset without being forced to browse through the entire dataset. In one example, an unsupervised or semi-supervised learning technique is performed to find classes of similar documents.

Figure 6:
FIG. 6 illustrates one example of sample documents from a document dataset.

To assess whether documents of separate types, possessing, for example, different stylistic features, are mapped to points in such a way that they can be recognized in an unsupervised or semi-supervised fashion, an experimental evaluation was performed. For the evaluation, sample documents of five different classes were selected, ranging from theater announcement brochures to newsletters. FIG. 6 illustrates one example of the sample documents selected from the document dataset, where each row corresponds to one of the 5 classes of documents in the dataset.

In one example, k-means clustering on the points of an 8-dimensional embedding of a document dataset was performed. Then the accuracy of the predicted classes compared to the actual classes was calculated. K-means clustering is a method that partitions points into k clusters in which each point belongs to the cluster of the nearest mean. K-means clustering is similar to the EM algorithm in that both methods iteratively attempt to determine the centers of natural clusters in a dataset.

With k-means clustering, the number of clusters is predetermined. Various methods are available for selecting the optimal number of clusters. In one example, the cost function of the k-means algorithm for a range of numbers of clusters was evaluated, and the value predicted in the following experiment was selected as the optimal number of clusters.

For the experiment, the points in the manifold were divided into training and testing sets. In one example, k-means clustering was performed on the training set, and the value of the cost function on the testing set was calculated. After each run of the experiment, the training and testing sets were reorganized in the cross-validation framework.

Figures 7, 9:
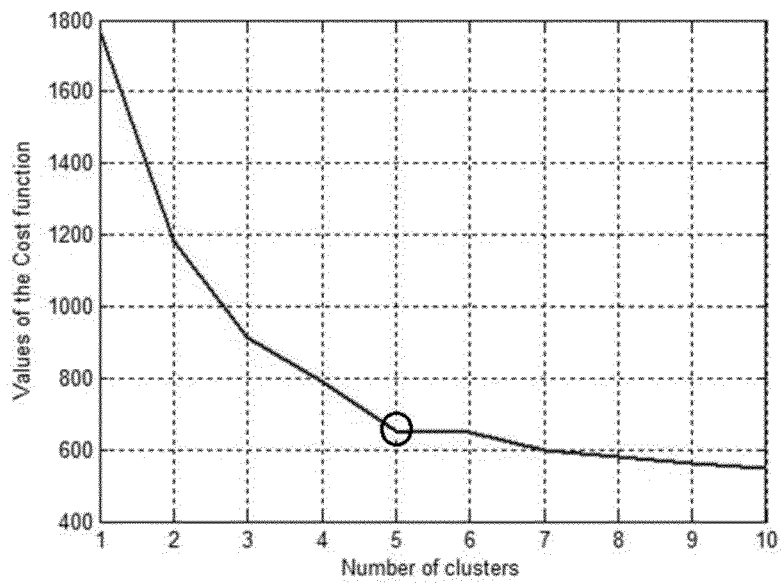
FIG. 7 illustrates one example of a resulting graph of values of a cost function as a function of a number of clusters.
FIG. 9 illustrates one example of an accuracy of classes predicted by the k-means algorithm.

FIG. 7 illustrates one example of a resulting graph of values of the cost function as a function of the number of clusters. Notably, the algorithm correctly predicted that there were five classes in the dataset. More specifically, the cost function quickly decreases as the number of clusters increases from the value one. Beyond five clusters, however, the cost function levels off, thereby indicating the predicted number of clusters in the manifold.

Figure 8B:
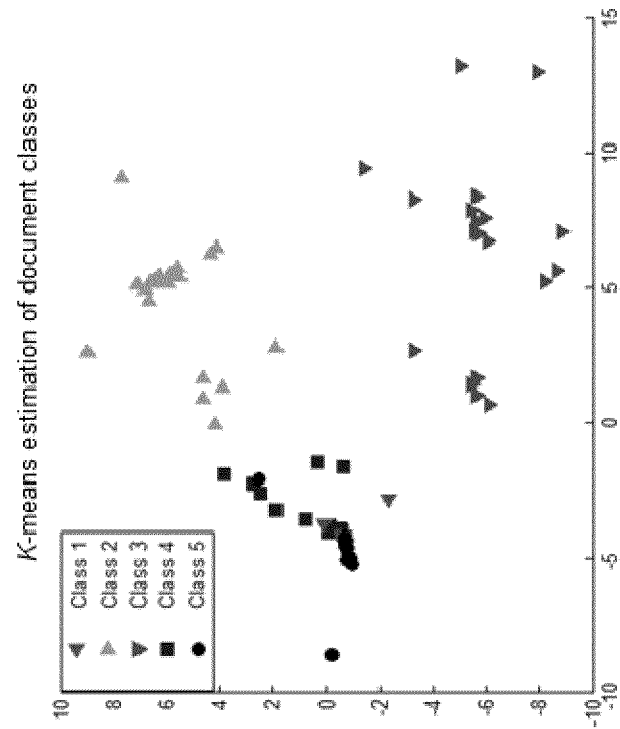
FIGS. 8A and 8B illustrate one example of 2-D embedding of a document dataset with actual and predicted classes.
Figure 8A:
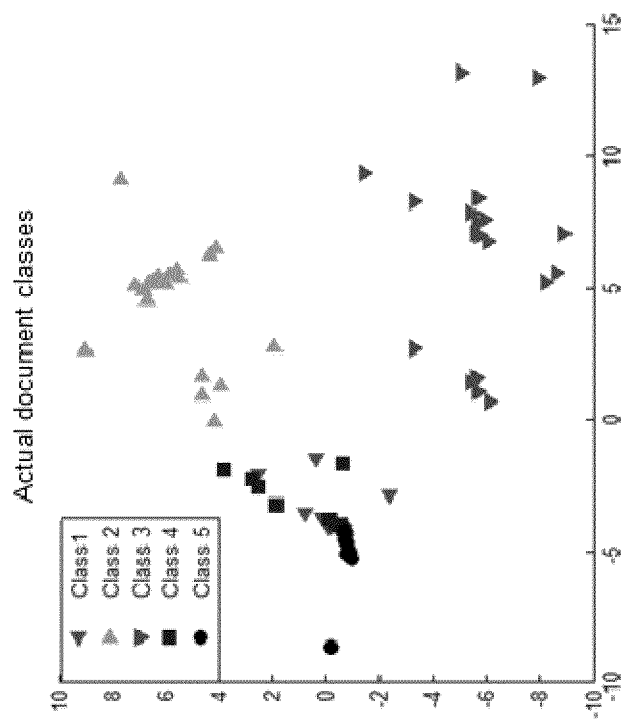

FIGS. 8A and 8B illustrates one example of 2-D embedding of the document dataset with actual and predicted classes. More specifically, FIG. 8A illustrates the 2-D embedding of the document classes of FIG. 5, and FIG. 8B illustrates the result of the k-means classification performed on an 8-dimensional manifold. Comparison of the results between the actual and predicted classes was positive. One example of the accuracy of the classes predicted by the k-means algorithm is illustrated in the table of FIG. 9. More specifically, in the table of FIG. 9, the percentage of correctly classified documents is shown below each class. Again, accuracy of the classes predicted by the k-means algorithm was favorable.

In one example, a pruning option for the similarity pyramid is provided. With the pruning operation, the user is allowed to "prune" the pyramid by eliminating documents that are not likely to be of interest, while retaining documents that are most likely to be of interest. As such, the pruning operation may be convenient when searching for documents similar to a query, since the reduced size of the pruned pyramid may make it easier to browse the pyramid.

In one example, pre-calculated clusters of the document dataset are used for the pruning operation. Accordingly, while browsing the pyramid, the user is allowed to select documents of interest, for example, by right-clicking on a document image icon. In one example, the selected documents are not limited by number, or by type or visual appearance. After the selection is complete, the user can "prune" the pyramid such that a "new" similarity pyramid will be constructed from the clusters of the selected documents. In one example, all of the irrelevant documents will be eliminated whereby the user can concentrate on the documents of interest.

Figure 10:
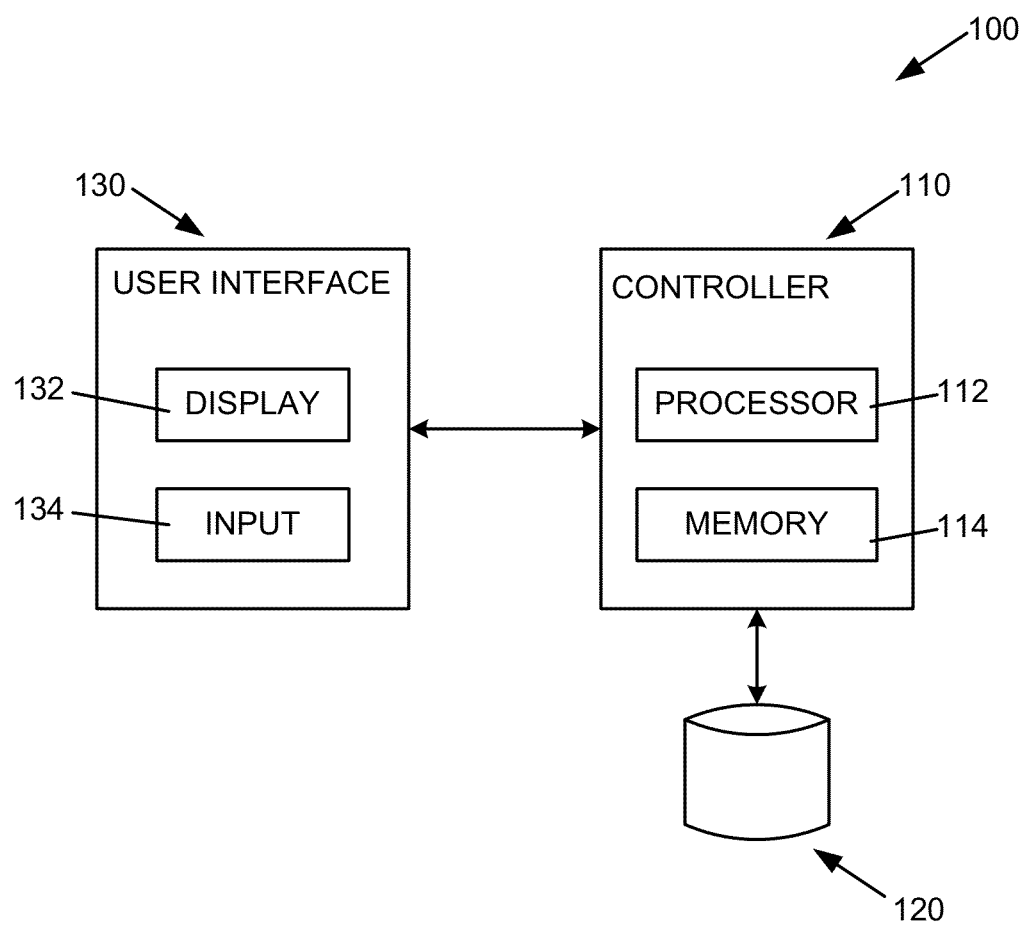
FIG. 10 is a block diagram schematically illustrating one example of a system for presenting content in a similarity pyramid.

FIG. 10 is a block diagram schematically illustrating one example of a system 100 for presenting content (e.g., documents) in a similarity pyramid, as described above. More specifically, system 100 facilitates construction of the similarity pyramid and presentation of a plurality of content (e.g., documents). In one example, system 100 includes a controller 110, a content database 120, and a user interface 130, with controller 110 communicated with database 120 to process the content and construct the similarity pyramid for display on user interface 130.

Controller 110 includes a processor 112 and memory 114, with associated hardware and/or machine readable instructions (including firmware and/or software), for implementing and/or executing computer-readable, computer-executable instructions for data processing functions and/or functionality.

In one example, a program including instructions accessible and executable by processor 112 of controller 110 is stored in a non-transitory storage medium that may be integral to controller 110 or may be located remotely and accessible, for example, over a network. Storage media suitable for tangibly embodying program instructions and data include all forms of computer-readable memory including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM, among others.

User interface 130 displays content in a similarity pyramid, as described above, for viewing by a user, and enables movement within levels and between levels of the similarity pyramid by the user. In one example, user interface 130 includes a display 132 and an input device 134. In one example, user interface 130 comprises a graphical user interface (GUI), and display 132 and input device 134 are combined into a single component. In another example, display 132 and input device 134 are provided as separate or different components.

Figure 11:
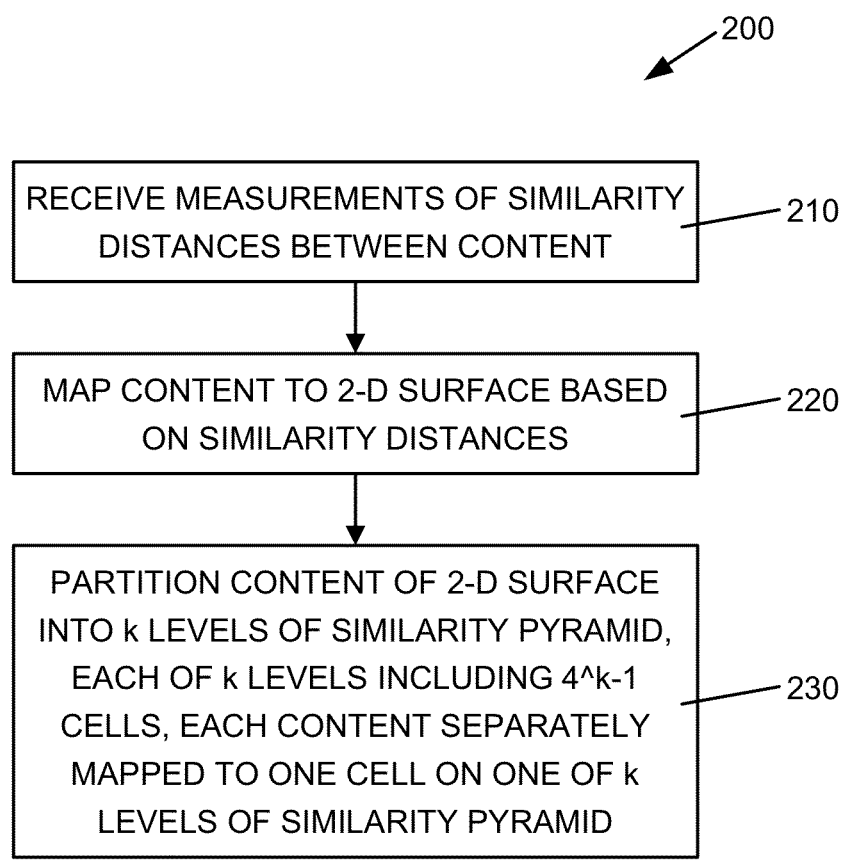
FIG. 11 is a flow diagram illustrating one example of a method of presenting content in a similarity pyramid.

FIG. 11 is a flow diagram illustrating one example of a method 200 of presenting content (e.g., documents) in a similarity pyramid, as described above.

At 210, measurements of similarity distances between the content (e.g., documents) are received. In one example, as described above, similarity measurement calculations are performed for each document of the dataset. In the non-limiting example, a document similarity function is defined by analyzing document background, text box, and saliency components such that the similarity distance between each of these components is calculated separately, and the similarity measure of the entire document is calculated as a weighted sum of these distances.

Next, at 220, the content (e.g., documents) are mapped to a two-dimensional surface based on the similarity distances. In one example, as described above, a nonlinear dimensionality reduction algorithm is applied to the document dataset to map the documents onto a two-dimensional (2-D) surface. In one example, the mapping algorithm preserves similarity distances between documents by mapping documents that are close to each other in a feature space to points that are close to each other on a 2-D surface. In one non-limiting example, as described above, the nonlinear dimensionality reduction algorithm includes the Isomap algorithm.

Next, at 230, the content (e.g., documents) of the two-dimensional (2-D) surface is partitioned into k levels of a similarity pyramid. In one example, as described above, each of the k levels of the similarity pyramid includes $4^{k-1}$ cells. The content (e.g., documents) of the two-dimensional (2-D) surface is partitioned such that each content of the plurality of content (e.g., each document of the document dataset) is separately mapped to one of the cells on one of the k levels of the similarity pyramid.

The methods and systems of the present disclosure provide for organization of a content database in a hierarchical structure called a similarity pyramid. Such structure provides for efficient organization of databases for browsing and searching applications. As an example, the present disclosure provides for the organization of single-page documents. In one example, the pyramid is constructed from a document database which is embedded on a 2-D surface with use of a nonlinear dimensionality reduction algorithm. One non-limiting example of the nonlinear dimensionality reduction algorithm includes Isomap. The mapping algorithm preserves a visual similarity measure between documents by mapping similar documents to points on a 2-D surface that are close to each other. With the disclosed similarity pyramid, a user can browse the document database by moving along a certain level of the pyramid or by moving between different levels of the pyramid. In addition, in one example, a pruning feature of the pyramid is provided, where the user is allowed to reorganize the database by eliminating irrelevant documents, and retaining only potentially relevant ones.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A method of presenting a plurality of content, comprising:
    receiving measurements of similarity distances between content of the plurality of content;
    mapping the content to a two-dimensional surface based on the similarity distances;
    partitioning the content of the two-dimensional surface into k levels of a similarity pyramid, wherein each of the k levels includes ($4^{k-1}$) cells, and wherein each content of the plurality of content is separately mapped to one of the cells on one of the k levels of the similarity pyramid: and
    displaying the similarity pyramid on a user interface,
    wherein partitioning the content into the k levels of the similarity pyramid comprises dividing the content by a first axis, and dividing the content of each region on each side of the first axis by a respective second axis perpendicular to the first axis.

2. The method of claim 1, wherein mapping the content to the two-dimensional surface includes preserving the similarity distances between the content on the two-dimensional surface.

3. The method of claim 1, wherein each of the k levels of the similarity pyramid include all of the content of the plurality of content.

4. The method of claim 1, wherein partitioning the content into the k levels of the similarity pyramid includes transforming the two-dimensional surface to a principal component coordinate system.

5. The method of claim 1, wherein regions on each side of the first axis include one of an equal number of content if a total number of the content within the regions is even, or an unequal number of content with one region including one more content than another region if a total number of the content within the regions is odd.

6. The method of claim 5, wherein regions on each side of the respective second axis include one of an equal number of content if a total number of the content within the regions is even, or an unequal number of content with one region including one more content than another region if a total number of the content within the regions is odd.

7. The method of claim 1, further comprising:
    assigning each non-empty cell of the similarity pyramid with an icon image, including assigning each non-empty parent cell of a non-bottom level of the similarity pyramid with an icon image from a child cell of a next-lower level of the similarity pyramid.

8. The method of claim 1, further comprising:
    supporting user movement on the user interface within each level of the similarity pyramid and between levels of the similarity pyramid.

9. The method of claim 1, wherein the plurality of content comprises one of a plurality of print content, a plurality of audio content, and a plurality of video content.

10. A method of presenting a plurality of content, comprising:
    defining a top level of a similarity pyramid as a single cell including a set of points representing similarity distances between content of the plurality of content;
    partitioning the single cell of the top level of the similarity pyramid into four cells of a next-lower level of the similarity pyramid;
    partitioning each cell of the next-lower level of the similarity pyramid into four cells of a further next-lower level of the similarity pyramid;
    repeating the partitioning of each cell of the next-lower level until each point is mapped separately to one cell on one level of the similarity pyramid: and
    displaying the similarity pyramid on a user interface,
    wherein partitioning the single cell of the top level of the similarity pyramid and partitioning each cell of the next-lower level of the similarity pyramid comprises dividing the content of each level by a first axis, and then dividing the content of each region on each side of the first axis by a respective second axis perpendicular to the first axis.

11. The method of claim 10, wherein each level of the similarity pyramid includes all of the content of the plurality of content.

12. The method of claim 10, wherein regions on each side of the first axis and regions on each side of the respective second axis include one of an equal number of content if a total number of the content within the regions is even, or an unequal number of content with one region including one more content than another region if a total number of the content within the regions is odd.

13. A system to present a plurality of content, comprising:
    a database to store the plurality of content;
    a controller to map measurements of similarity distances between content of the plurality of content to a two-dimensional surface and partition the two-dimensional surface into a plurality of levels of a similarity pyramid, wherein each level of the similarity pyramid includes all of the content of the plurality of content, and each level of the similarity pyramid includes at least one cell including content of the plurality of content, and wherein each cell of a non-bottom level of the similarity pyramid has four child cells on a next-lower level of the similarity pyramid; and
    a user interface to display the similarity pyramid,
    wherein, to partition the two-dimensional surface into the plurality of levels of the similarity pyramid, the controller is to divide the content of each level by a first axis, and then divide the content of each region on each side of the first axis by a respective second axis perpendicular to the first axis.

14. The system of claim 13, wherein regions on each side of the first axis and regions on each side of the respective second axis include one of an equal number of content if a total number of the content within the regions is even, or an unequal number of content with one region including one more content than another region if a total number of the content within the regions is odd.

* * * * *

UNITED STATES PATENT AND TRADEMARK OFFICE
CERTIFICATE OF CORRECTION

PATENT NO. : 8,429,163 B1
APPLICATION NO. : 13/357961
DATED : April 23, 2013
INVENTOR(S) : Ildus Ahmadullin et al.

Page 1 of 1

It is certified that error appears in the above-identified patent and that said Letters Patent is hereby corrected as shown below:

In the Claims:

In column 11, line 41, in Claim 1, delete "pyramid:" and insert -- pyramid; --, therefor.

In column 12, line 32, in Claim 10, delete "pyramid:" and insert -- pyramid; --, therefor.

Signed and Sealed this
Twentieth Day of August, 2013

Teresa Stanek Rea
*Acting Director of the United States Patent and Trademark Office*